United States Patent [19]

Mishuku et al.

[11] 4,082,559
[45] Apr. 4, 1978

[54] CEMENTED CARBIDE PRODUCTS AND MANUFACTURING METHOD

[75] Inventors: Minoru Mishuku, Hiratsuka; Taro Edo, Tokyo; Nobujiro Tsuchiya, Yamato, all of Japan

[73] Assignee: Fuji Die Co., Ltd., Tokyo, Japan

[21] Appl. No.: 760,961

[22] Filed: Jan. 21, 1977

[30] Foreign Application Priority Data

Aug. 31, 1976 Japan .................................. 51-103187

[51] Int. Cl.$^2$ .................................. C04B 35/56
[52] U.S. Cl. .................................. 106/43; 75/204; 75/208 R; 75/240; 106/73.6; 428/547; 423/440
[58] Field of Search ................ 106/43, 73.6; 423/440; 264/37; 75/204, 208 R, 240; 428/547, 548, 552

[56] References Cited

U.S. PATENT DOCUMENTS

| | | |
|---|---|---|
| 2,889,138 | 6/1959 | Haglund .......................... 75/204 X |
| 3,165,822 | 1/1965 | Beeghly ........................... 75/203 X |
| 3,438,730 | 4/1969 | Shwayder ........................ 423/440 X |
| 3,947,555 | 3/1976 | MacInnis et al. .................... 423/440 |
| 3,953,194 | 4/1976 | Hartline et al. .................. 423/440 X |
| 3,999,954 | 12/1976 | Kolaska et al. ...................... 75/204 |

FOREIGN PATENT DOCUMENTS 2,433,737  1/1976  Germany .............................. 106/43

*Primary Examiner*—G. O. Peters
*Attorney, Agent, or Firm*—Blanchard, Flynn, Thiel, Boutell & Tanis

[57] ABSTRACT

If cemented carbide products such as hot rolling-mill rolls, plugs and dies can be made of the powder reclaimed from scrapped cemented carbide products and the virgin powder of cemented carbide, it is possible to obtain cemented carbide products lower in price and capable of meeting the requirements of severe working conditions.

7 Claims, 12 Drawing Figures

Fig. 1
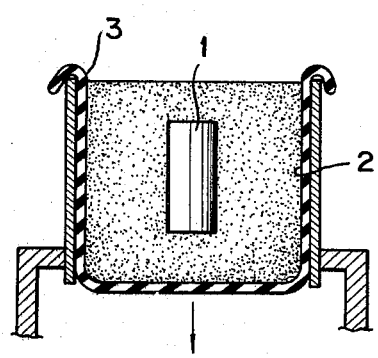
Fig. 4
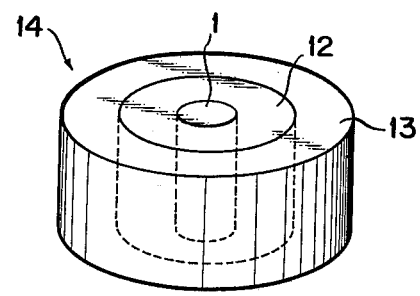
Fig. 2
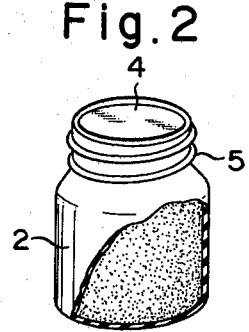
Fig. 5
Fig. 3
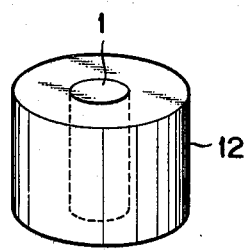
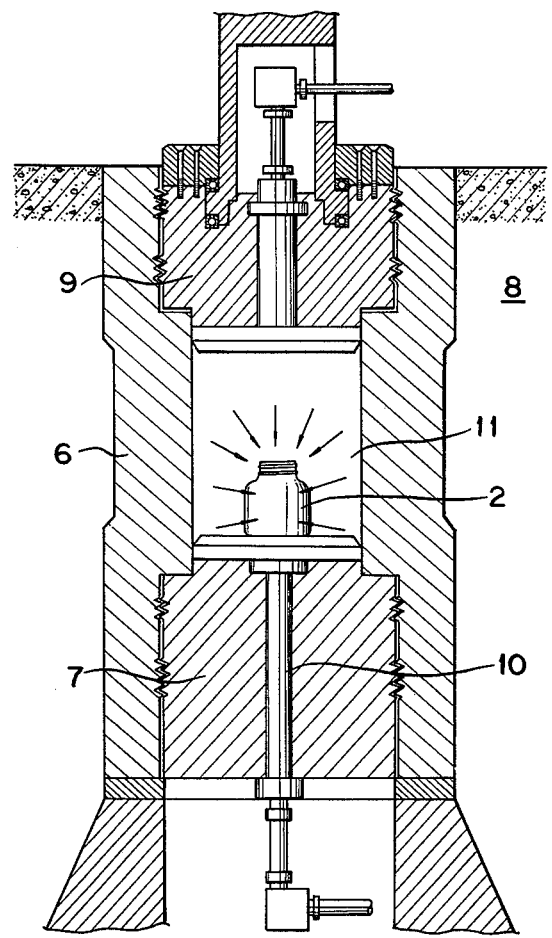

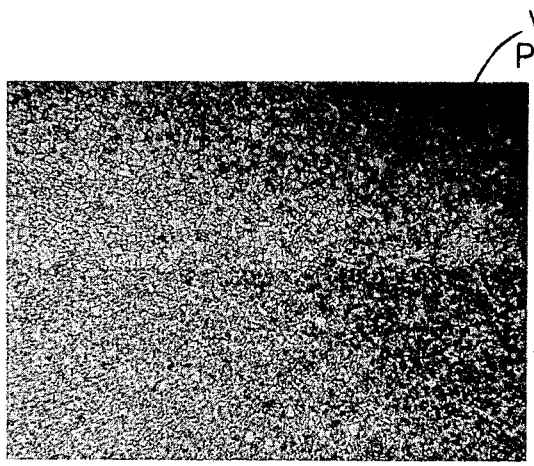
FIG. 6 X200
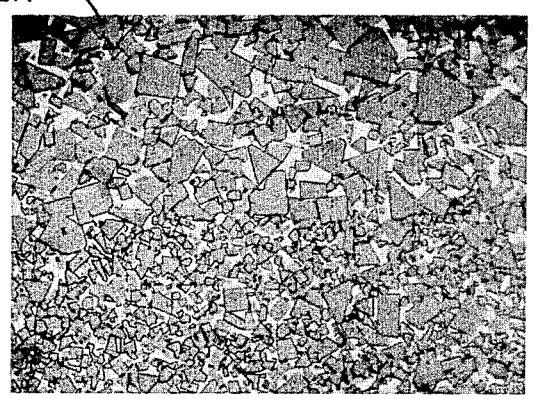
FIG. 7 X1000
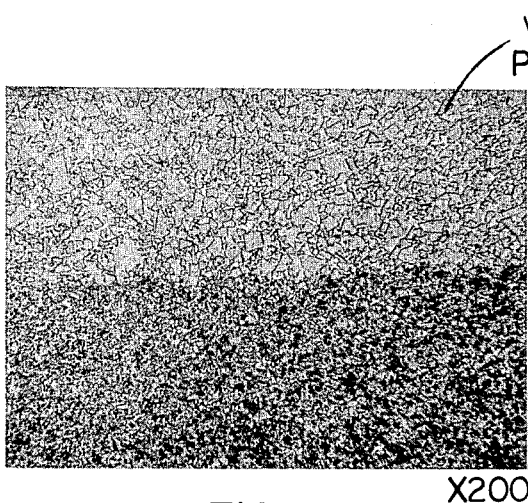
FIG. 8 X200
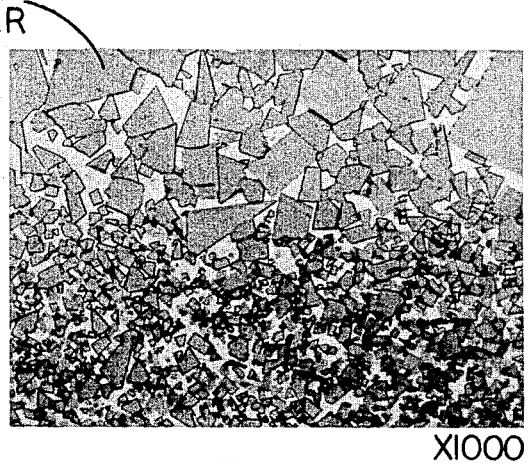
FIG. 9 X1000

CEMENTED CARBIDE PRODUCTS AND MANUFACTURING METHOD

This invention relates to cemented carbide products such as hot or cold rolling-mill rolls, plugs, dies, hot extruding sleeves, metal molds, reducing molds, particularly large, thick and heavy ones and methods of manufacturing such products.

The afore mentioned hot rolls, plugs, dies and so forth are much used today for their superior cemented carbide properties. However, the required raw materials are so expensive that various improvements have hitherto been proposed to lower the costs of such products. In the case of hot rolling-mill rolls, for example, only the peripheral surface of the roll is made of cemented carbide. This method may be able to reduce the manufacturing cost of such products to some extent but it is unable to make a noticeable improvement of their durability and to achieve a considerable increase in their economical efficiency. This is due to the following reasons. The hot rolling rolls are subjected to such severe working conditions that the surface layer of cemented carbide must be made so thick as to have a strength sufficient to meet such severe requirements, thus making it impossible to make so much improvement from the standpoint of their economy. Furthermore the efficient transmission of torque from the roll shaft made of steel to the cemented carbide part of the roll makes it necessary for the roll construction to be more complex than other types. And the considerable difference in thermal expansion coefficient between steel and cemented carbide causes a great internal pressure to be exerted on the cemented carbide part of the roll with the result being that a circumferential tensile stress is present in the said roll. In order to cope with the occurrence of such stress, it is necessary to provide a water-cooling jacket built in the roll, which causes a great deal of trouble and increases the complexity of the roll construction. For this reason, the method of using a cemented carbide only for the peripheral part of the roll has not been much in use. As a matter of fact, the rolls of this type, whose peripheral surfaces have worn to the usable limits, are now scrapped and reused for other purposes than hot rolling rolls (antiskidding spikes for automobile tires, for instance). The situation is not much different about other cemented carbide products, that is, those which have worn away in the excess of their usable limits have hitherto been just discarded.

In view of such a situation, the present inventors carried many researches and experiments in an attempt to obtain the cemented carbide products that are lower in cost and capable of meeting severe working conditions and a method of making cemented carbide products. As a result they found that such desired cemented carbide products can be obtained if the powder of cemented carbide reclaimed from the above-mentioned scrapped hotrolling mill rolls and others is used to form the greater portion of a product while limiting the use of virgin powder of cemented carbide where it is essential. The results of their experiments have shown that the part made of reclaimed powder and the part made of virgin powder are integrated by sintering so well that their boundary layers exhibit a metal bond as if they were a single of phase of alloy. The present invention is proposed on the basis of this finding.

It is therefore an object of the present invention to provide cemented carbide products in which the virgin powder of WC-based cemented carbide is used only where it is essential, that is, the part which comes into contact with the workpiece and the rest is made of the powder reclaimed from scrapped cemented carbide products.

Another object of the present invention is to provide a cemented carbide product manufacturing method in which reclaimed powder and virgin powder are made into green compacts, respectively, and the two compacts are bonded together by sintering.

Other objects and characteristic features of the present invention will be made clear by reading the following description of the drawings and embodiments and what we claim.

FIG. 1 is a longitudinal section of the rubber mold loaded with the raw material powder;

FIG. 2 is a perspective view of the rubber mold;

FIG. 3 is a perspective view of the green compact which is formed into an inner roll;

FIG. 4 is a perspective view of the inner and outer rolls formed with green compacts which are properly put together to make an integral roll;

FIG. 5 is a simplified longitudinal section of the important part of the rubber press;

FIG. 6 and FIG. 7 are the photomicrographs showing the microscopic structure in the boundary zone where the two compacts are jointed to form a hot rolling-mill roll in Embodiment 1 (FIG. 6 is a view magnified 200 times and FIG. 7 is a view magnified 1,000 times);

FIG. 8 and FIG. 9 are the photomicrographs showing the boundary zone where the two compacts are jointed to form a hot rolling-mill roll in Embodiment 2 (FIG. 8 is a view magnified 200 times and FIG. 9 is a view magnified 1,000 times);

Detailed description of the present invention will be made in reference to its application in the manufacture of WC - Co rolls in the hot rolling-mill as follows.

So far as the present inventors are aware, prior hot rolling-mill rolls made of cemented carbide have been discarded when their initial outside diameter of 210mm$\phi$ is worn down to 191mm$\phi$ and when their initial outside diameter of 170mm$\phi$ is worn down to 154mm$\phi$. The method for obtaining the raw material powder by reclaiming from the discarded cemented carbide scrap will not described herein, for "A method of manufacturing the reclaimed the cemented carbide powder" which is known as Japanese Patent Publication No. 27457/69 can be employed for the purpose. Since the reclaimed raw material powder (hereafter referred to as "reclaimed powder") which is obtained by this method is usually of low grade, it is mixed and pulverized in a ball mill so that the particles may become smaller and uniform in size. For example, a reclaimed powder with a deflective strength of 200 to 210kg/mm$^2$ is upgraded to cover 280kg/mm$^2$ and if its hardness is 85.5 (Rockwell A hardness) it is increased to 86 (Rockwell A hardness). It is needless to say that the reclaimed powder to be used should be of the highest possible purity and uniform in particle size.

On the other hand, cemented WC - Co carbide of good quality is to be used for the virgin raw material powder (hereafter to be referred to as "virgin powder"). The WC particle size should be 2 to 8μ and the Co particle size should be 0.1 5μ.

The present invention is characterized by the use of reclaimed and virgin powders to form a hot rolling-mill roll, that is, the reclaimed powder is pressed to shape the inner part of the roll and the virgin powder is pressed to shape the outer part of the roll and thus obtained green compacts are united together and sintered to integrate them to form a single hot rolling-mill roll. The outer part of the roll to be made with the virgin powder is so thick that it reaches at least the allowable wear limit for the roll.

Figure 10:
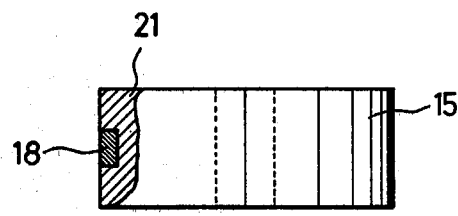
FIGS. 10, 11 and 12 are the partially broken views of the variations of the roll shown in FIG. 4, wherein the outer part of the respective rolls which contacts the material to be handled is made of virgin powder.
Figure 11:
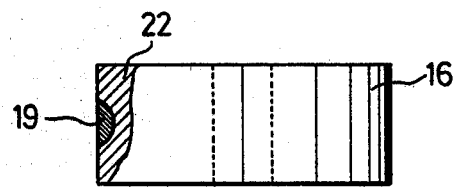

The "allowable wear limit for the roll" mentioned herein means mainly the thickness of the roll from its peripheral surface to the inside. Another characteristic feature of the present invention is that the part of the minimum required thickness of the roll is made of virgin powder. According to the present invention, the "allowable wear limit" is considered in terms of not only the thickness but also a certain area of the peripheral surface of the roll so that only the part of the minimum required area and the corresponding thickness is made of virgin powder. (This point will be described in detail later in FIGS. 10 through 12 and in Example 5.)

The following three methods (a), (b) and (c), can be used in the molding, forming and sintering of the green compacts.

(a) A metal core of suitable dimensions is set in the compacting press and the space outside the core is filled with the reclaimed powder and pre-pressed to form the green compact for the inner part of the roll in the desired form. Next, the virgin powder is loaded outside the aforementioned compact and compacted in the press so that the compacting of the powder for the outer part of the roll and the union of the two compacts can be achieved simultaneously. It is permissible to cut the outside of the compact for the inner part of the roll to make adjustments of its outside diameter and also to smooth the surface before loading the virgin powder. The aforementioned united compacts are machined to adjust the height and outside diameter to obtain a green compact of ultimate dimensions and the metal core is removed and the compact is provisionally sintered to remove the binder and then sintered in earnest. The final sintering causes the boundary layers of the two united compacts to be perfectly integrated through metallic bond to exhibit a single phase of alloy. As for the aforementioned compacting press, it is preferable to use the rubber press, which is economical because the two compacts are united in a natural way in the compacting stage and which makes it easier to perform the compacting process because the compact for the outer part of the roll can be contracted in accordance with the contraction of the compact for the inner part of the roll. When this method is used to make dies, it is possible to use virgin powder for the inner compact and reclaimed powder for the outer compact.

(b) The reclaimed powder is used to press-form the green compact for the inner part of a roll while virgin powder is used to press-form the outer part of the roll separately. The former compact is formed by using a higher pressing force so that it has a lower contraction coefficient while the latter compact is formed so that it has a somewhat higher contraction coefficient, thereby to facilitate the integration of the two compacts and to prevent the occurrence of cracking and other defects. The properly formed compacts are cut and ground to the required dimensions and then united together and sintered in a similar manner as described in the preceding paragraph (a) so that they are perfectly integrated into a single unit. As in the case in (a), the relative positions where the virgin and reclaimed powders can be changed according to the type of cemented carbide products to be made.

(c) The inner part and the outer part of a roll are press formed separately, using the reclaimed powder and the virgin powder, respectively to obtain two separate compacts. So far this method is similar to that described in (b). Next, the compact for the inner part of the roll is sintered first and the compact for the outer part of the roll is fitted to the sintered compact. That is to say, the compact for the outer part of the roll is given a binder removing treatment at below 500° C and it is fitted to the sintered compact for the inner part of the roll and then they are sintered together so that they are perfectly integrated. In this case, it is also possible to change the relative positions where the virgin powder and the reclaimed powder are used.

Either of the aforementioned methods, (a), (b) and (c), is used to integrate two compacts using the virgin powder and the reclaimed powder to produce hot rolling-mill rolls and other cemented carbide products. Here lies another characteristic feature of the present invention.

The following examples will illustrate the invention.

(EXAMPLE 1)

| Virgin powder: | Average WC particle size: | 5μ |
| --- | --- | --- |
| | Co particle size: | 1.5μ |
| | Co content: | 13% |
| Reclaimed powder: | Average WC particle size: | 3μ |
| | Co particle size: | 2μ |
| | Co content: | 13% |
| Compacting press: | Rubber press | |
| | Working pressure: | 1500kg/cm² (max.,) |
| | Effective capacity: | 600mmφ × 800mm$^L$ |

Manufacturing process: The above (a) method was used to manufacture hot rolling-mill rolls as illustrated by the drawings.

Using a steel core of 75.5mmφ × 85mm$^H$(1), the rubber mold 2 was filled uniformly with 25kg of reclaimed powder as shown in FIG. 1. When filling the mold, vacuum suction may be used to drawn the powder downward in the direction indicated by arrow so that the powder is packed more firmly in the mold. Next, seal the opening 3 of the rubber mold 2 using the stopper 4 and wire 5 and it was prepressed (using a pressure of 300kg/cm²).

The prepressing and the final pressing to be described later were carried out by the use of the aforementioned rubber press as shown in FIG. 5. As illustrated in FIG. 5, the main body of the rubber press 6, which is roughly shaped like a cylinder, is embedded in the floor 8 with its bottom being closed with the stopper 7 and the upper opening being fitted with a stopper 9 which is detachable so that the opening can be closed and opened as required. A high-pressure fluid (water) from a compressor (not illustrated) is forced through a conduit 10 passing through the stopper 7 so that the empty space 11 inside the rubber press body 6 is filled with the fluid to press the rubber mold 2, which was placed in the empty space 11 beforehand, with a hydrostatic pressure. After pressing the rubber mold, the compact 12 for the inner part of the roll is lifted out of the mold 2 and set on a lathe. With the core 1 being held firmly between the two centers of the lathe, the compact 12 was cut to reduce its outside diameter from 140mmφ to 120mmφ and also to smooth its outside surface. Next, 30kg of virgin powder was packed outside the compact 12 placed in the rubber mold 2 in such a manner as mentioned before and pressed with a static pressure of 1000kg/cm². In FIG. 4, 13 is the compact for the outer part of the roll. The two compacts 12 and 13, which was pressed together to form a single compact 14, was removed from the rubber mold 2 and was lathed to reduce its outside diameter and height to 134.6mmφ × 76 ~ 77mm$^H$. The core 1 was removed from the compact 14, which in turn was placed in an oven where it was heated to 500° C in a hydrogen atmosphere to melt and remove the paraffin which had been used as a binder and then it was presintered at 1200° to 1250° C. After being cooled down, the compact 14 is transferred into a vacuum sintering oven to be sintered at 1200° to 1250° C. Finally, the sintered product was given a hot hydrostatic pressure treatment in an argon atmosphere at 1300° C and 1000 atmospheres so that it is completely free from pores and has an increased strength. Integration:

There was no flaw in the entire boundary zone where the two compacts 12 and 13 were united and it was found that the virgin powder was diffused thoroughly into the reclaimed powder to produce a state of a single phase of alloy by accomplishing a complete metallic bond.

Referring to the photomicrographs showing the magnified views of the boundary zone between the integrated virgin powder and the reclaimed powder portions, FIG. 6 (×200) and FIG. 7 (×1000) show that the coarse-grained virgin powder section (upper) and fine-grained reclaimed powder section (lower) are completely integrated in their boundary zone and moreover the reclaimed powder section is perfectly free from pores.

(EXAMPLE 2)

| virgin powder | Average WC particle size: | 13μ |
| | Co particle size: | 1.5μ |
| | Co content: | 16% |

A hot rolling-mill roll was made of the aforementioned virgin powder and the reclaimed powder used in Example 1, using the method employed in Example 1. Referring to the photomicrographs showing the magnified views of the boundary zone where the two compacts are united together, the state of integration of the virgin powder section and the reclaimed powder section will be explained. In FIG. 8 (×200) and Fig. and FIG. 9 (×1000), the upper virgin powder section (coarse-grained) and the lower reclaimed powder section (fine-grained) are perfectly integrated in the boundary zone and the reclaimed powder section is free from pores.

(EXAMPLE 3)

Different types of cemented carbide products were made by the use of the same virgin and reclaimed powders and the rubber press as in Example 1 and they were used as test pieces to conduct a breaking test to investigate the strength of the alloy made by the integration of virgin and reclaimed powders of cemented carbide.

The following three methods were used to determine the transverse rupture strength.

I.  Breaking test on a test piece made with two sections of different carbides joined side by side (the joint is located in the center of the integral piece).

II.  Breaking test on a test piece comprising the two sections joined together one on top of another, in which pull is applied on the section made of reclaimed powder.

III.  Breaking test on a test piece made with the two sections joined together one on top of another, in which pull is applied on the section made of virgin powder.

Seven test pieces were used in each test.

| | transverse rupture strength (kg/mm²) | | | | | | | Mean value |
| --- | --- | --- | --- | --- | --- | --- | --- | --- |
| Test I | 268 | 272 | 257 | 279 | 257 | 270 | 281 | 269 |
| Test II | 256 | 261 | 274 | 272 | 280 | 275 | 268 | 269 |
| Test III | 307 | 307 | 301 | 299 | 290 | 310 | 306 | 303 |

The transverse rupture strengths of the cemented carbides made of virgin powder and reclaimed powder, respectively, are as follows.

| | transverse rupture strength (kg/mm²) | | | | | | | Mean value |
| --- | --- | --- | --- | --- | --- | --- | --- | --- |
| Reclaimed powder | 269 | 258 | 268 | 272 | 264 | 265 | 268 | 266 |
| Virgin powder | 302 | 318 | 321 | 319 | 312 | 314 | 321 | 315 |

The strength of the piece prepared by uniting the two pieces of cemented carbide by Method I must be restrained by either the strength of the right-hand piece or that of the lefthand one, whichever is lower and the test results were the same, that is, the strength of the two pieces united into one was not different from that of the cemented carbide made of reclaimed powder. This fact proves that the joint area has no flaw to lower the strength of the piece made by uniting the two pieces. The results of the tests II and III show that the strength is determined by that of the cemented carbide, on which pull is applied, and suggest that the strength would not decrease when the virgin powder is used for the surface layer (the part which is actually used) of a machining tool and the reclaimed powder is used for the inner part thereof.

(EXAMPLE 4)

The same virgin powder, the reclaimed powder and manufacturing method as used in Example 1 were used to make 8-inch roll (210mmφ) and 6-inch roll (170mmφ) for use in a block mill for hot-rolling wires (about 5 to 10mmφ in outside diameter) for the purpose of making comparison with the similar rolls made entirely from the virgin powder in the respects of material saving and cost reduction. The results were as shown in Table A below. The dimensional conditions of the 8-inch and 6-inch rolls were as shown in Table B.

Table A

| Hot-rolling roll | Material saving ratio | Cost reduction ratio |
| --- | --- | --- |
| 8-inch roll | (Approx.) 57% | (Approx.) 25% |
| 6-inch roll | (Approx.) 70% | (Approx.) 24% |

TABLE B

| Hot-rolling roll | Entire roll | | | |
| --- | --- | --- | --- | --- |
| | Outside Dia. | Inside Dia. | Weight | Height |
| 8-inch roll | 210mm$\phi$ | 130mm$\phi$ | 21.7 kg | 70mmH |
| 6-inch roll | 170mm$\phi$ | 105mm$\phi$ | 13.2kg | 65mmH |

| Hot-rolling roll | Inner part of roll made of reclaimed powder | |
| --- | --- | --- |
| | Outside Dia. | Weight |
| 8-inch roll | 180mm$\phi$ | 12.4kg |
| 6-inch roll | 144mm$\phi$ | 7.2kg |

Table A shows that the material requirements and manufacturing cost have been greatly reduced.

Referring to the above descriptions and Examples 1, 2 and 4, the roll was considered to be composed of two parts, inner and outer part, so that the inner part would be made of reclaimed powder and inner part made of virgin powder. However, what is aimed at by the present invention is to use virgin powder to form the "part required for use" of the roll, that is, the "part coming into contact with the material" and to use reclaimed powder to make the rest of the roll. Therefore, it is needless to say that in the case of the aforementioned hot rolling-mill rolls the outer part is to be made of virgin powder but in the case of other cemented carbide products the virgin powder is to be made in different parts according to the shapes and the purposes for which they are used. In the case of dies, for instance, virgin powder is to be used for making the inner part which comes into contact with the material to be handled.

Furthermore, according to the present invention the above "part required for use," that is, "part coming into contact with the material" can be defined more definitely. In the case of the hot rolling-mill roll, for example, it is permissible, to use virgin powder for making only the outmost part (of the outer part of the roll) which contacts the material (the part of the minimum required area and the corresponding thickness) instead of using the virgin powder for the entire outer part and to use reclaimed powder for the rest of the roll. This is another characteristic feature of the present invention, which will be described referring to FIGS. 10 through 12. The hot rolling rolls 15, 16 and 17 use virgin powder only for their peripheral part 18, 19 and 20 which contact the wire to be drawn while using reclaimed powder for all other parts. To form the virgin powder parts 18, 19 and 20, the virgin powder is filled in the circular groove provided on the outer surface of the reclaimed powder parts 21, 22 and 23 and they are pressed together so that the virgin powder parts are united with the reclaimed powder parts. Thereafter the entire roll is sintered to metallurgically integrate the virgin powder parts 18, 19 and 20 and the reclaimed powder parts 21, 22 and 23. This manufacturing method is essentially the same with the aforementioned method (a) and therefore no further details will be given herein. The virgin powder part 18 in FIG. 10 has a rectangular section, the virgin powder part 19 in FIG. 11 has a spherical section, and the virgin powder part 20 in FIG. 12 has a section with inclined surfaces to facilitate the integration of the virgin powder parts with the reclaimed powder parts with the respective reclaimed powder parts 21, 22 and 23. In the example shown in FIG. 12, the virgin powder part 20 is provided with a caliber 24.

(EXAMPLE 5)

Figure 12:
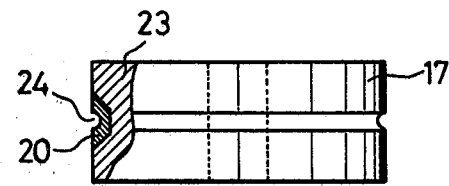

A 6-inch (170mm$\phi$) hot rolling-mill roll made in such a construction as shown in FIG. 12 was tested in the hot rolling of wire material and was found to have a performance comparable with a roll made entirely of virgin powder. In this example, about 3.9kg of virgin powder and about 9.6kg of reclaimed powder were used to make the roll so that it was possible to reduce the required amount of virgin powder to so much as 29% in relation to the entire roll. Moreover, the virgin powder part and reclaimed powder part were so perfectly integrated together that when visually inspected the boundary line between the parts was utterly undiscernible and it was impossible to visually distinguish the above roll (FIG. 12) from the previously used roll made entirely of virgin powder.

The above decriptions concerned only the cemented carbide hot rolling-mill rolls and the descriptions of other cemented carbide products were not given herein. The present invention is, needless to say, applicable as it is to various other cemented carbide products (e.g. dies, plugs, polishing discs, etc.). In this case, however, it is necessary to employ the aforementioned methods (a), (b) and (c) properly modified as required in the manufacture of the respective cemented carbide products.

As described above, the present invention has the following many distinguishing features. In forming the cemented carbide carbides, particularly large, thick and heavy ones, the reclaimed powder is used for a larger part of such a product while limiting the use of the virgin powder only where it is essential, that is, the part which comes into direct contact with a workpiece, thus enabling a great saving of the WC base, which is a rare natural raw material, and greatly reducing the cost. Furthermore, since the part of the reclaimed power and the part of the virgin powder are united together through metallic bond by sintering so that the two parts are perfectly integrated into a single unit, thus obtained product can compare with a product made entirely from the virgin powder and it is capable of satisfying all conditions required of the cemented carbide products.

What we claim is:

1. Cemented carbide products made by a method in which a compact of virgin powder of WC-based cemented carbide and a compact of the powder reclaimed from cemented carbide scrap are united together and sintered to produce a metallic bond in the boundary zone between the two compacts, thereby perfectly integrating them into a single unit.

2. The cemented carbide products as in claim 1 in which the virgin powder of WC-based cemented carbide is used in the part extending as deep as the allowable wear limits.

3. The cemented carbide products as in claim 1 in which the virgin powder of WC-based cemented carbide is used in the part of the minimum required area of surface and the corresponding thickness.

4. A method of manufacturing cemented carbide products, in which a compact of the virgin powder of cemented carbide and a compact of the powder reclaimed from cemented carbide scrap are integrated by sintering into a single unit, characterized in that one of the two raw material powders is prepressed by a compacting press into the desired shape of compact and then the other powder is packed around it, they are pressed together to obtain a compact in which the aforementioned two compacts are united one outside other, the united compact is heat-treated to remove the binder and then sintered to be integrated into a single unit.

5. A method of manufacturing cemented carbide products as in claim 4 in which the rubber press is used as a compacting press.

6. A method of manufacturing cemented carbide products, in which a compact of the virgin powder of WC-based cemented carbide and a compact of the powder reclaimed from cemented carbide scrap are integrated by sintering into a single unit, characterized in that the two raw material powders are press-formed separately to obtain two compacts which can be united together, one of which has a lower contraction coefficient than that of the other, the two compacts are united together with the one of lower contraction coefficient inside the other compact with a high contraction coefficient, and then they are sintered to be integrated into a single unit.

7. A method of manufacturing cemented carbide products, in which a compact of the virgin powder of WC-based cemented carbide and a compact of the powder reclaimed from cemented carbide scrap are integrated by sintering into a single unit, characterized in that the two raw material powders are pressformed separately to obtain two compacts which can united together, one of which has a lower contraction coefficient than that of the other, the compact with a lower contraction coefficient is first sintered, the other compact is set outside the sintered compact and they are sintered together to be integrated into a single unit.

* * * * *